Dec. 12, 1950     A. J. BERGER     2,533,214

FOG RESISTANCE TESTING APPARATUS

Filed June 20, 1945     2 Sheets-Sheet 1

INVENTOR.
Arthur J. Berger
BY Ralph L. Chappell
ATTORNEY

Dec. 12, 1950 A. J. BERGER 2,533,214
FOG RESISTANCE TESTING APPARATUS
Filed June 20, 1945 2 Sheets-Sheet 2
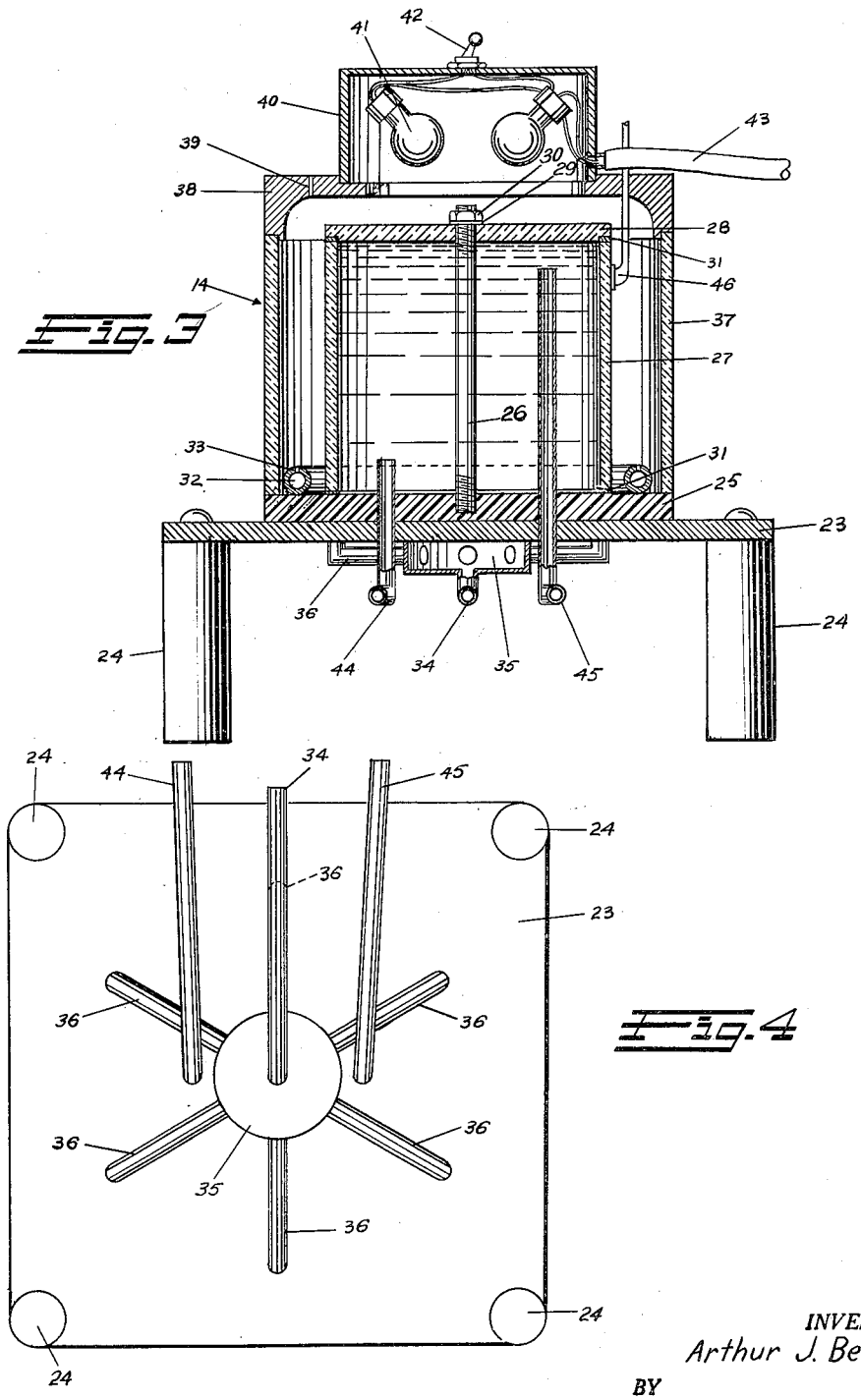
INVENTOR.
Arthur J. Berger
BY
Ralph L Chappell
ATTORNEY Patented Dec. 12, 1950

2,533,214

UNITED STATES PATENT OFFICE 2,533,214

FOG RESISTANCE TESTING APPARATUS

Arthur J. Berger, New York, N. Y.

Application June 20, 1945, Serial No. 600,626

2 Claims. (Cl. 73—15.4)

(Granted under the act of March 3, 1883, as amended April 30, 1928; 370 O. G. 757)

This invention relates to an apparatus for testing the resistance to fogging of sheet plastic materials, liquid films, pastes and other materials.

It is common experience that under conditions of low temperature and high humidity, moisture tends to collect on the surfaces of transparent objects such as lenses, windows, and the like, in the form of fine droplets, decreasing or destroying the transparency of the transparent objects. Numerous plastic films, pastes and liquids have been suggested to overcome this tendency of transparent objects to lose transparency through fogging.

It is an object of this invention to provide an apparatus for testing under controlled and reproducible conditions the resistance to fogging of sheet plastic materials, liquid films, pastes and the like.

Another object is to provide an apparatus for testing under controlled and reproducible conditions the ability of transparent plastic sheets, liquid films and pastes to return to a condition of transparency upon the evaporation of moisture condensed thereon.

Another object is to provide an apparatus for testing under controlled and reproducible conditions the resistance to fogging of plastic sheets, liquid films and pastes through successive cycles of moisture condensation and evaporation.

Further objects and advantages of this invention, as well as its construction, arrangement and operation, will be apparent from the following description and claims in connection with the accompanying drawings, in which:

Fig. 3 is a central vertical section through the testing chamber of Fig. 2.

Fig. 4 is a bottom plan view of the testing chamber of Fig. 2.

Figure 1:
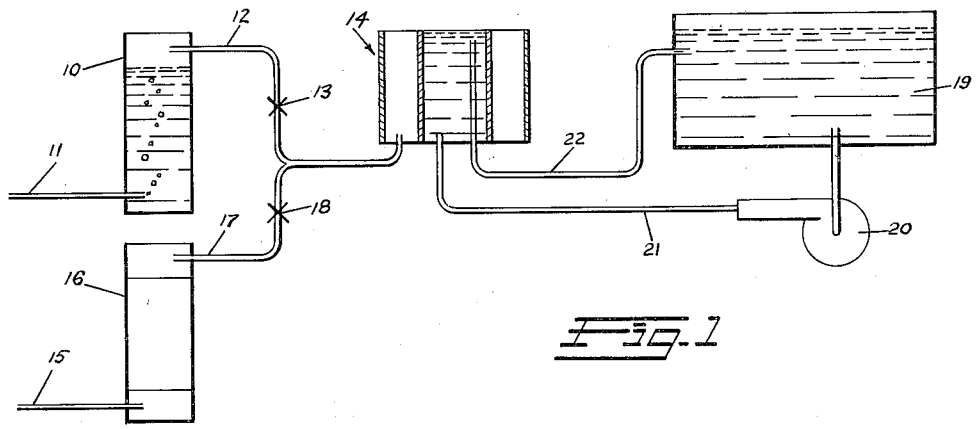
Fig. 1 is a schematic diagram of the apparatus of this invention.

Fig. 1 shows a water tower 10 into which air is forced through line 11, where it bubbles through the water and then passes through line 12 and valve 13 to the testing chamber, generally designated 14. Air can alternately be forced to the testing chamber 14 through line 15, drying tower 16, line 17 and valve 18. Reservoir 19 is filled with water or other coolant liquid, the temperature of which is automatically controlled by any conventional means (not shown). Pump 20 withdraws coolant from reservoir 19 and pumps it to the testing chamber 14 through line 21. Pump 20 can be any conventional pump, operated by any suitable driving means (not shown). Line 22 carries return coolant from the testing chamber to reservoir 19.

Figure 2:
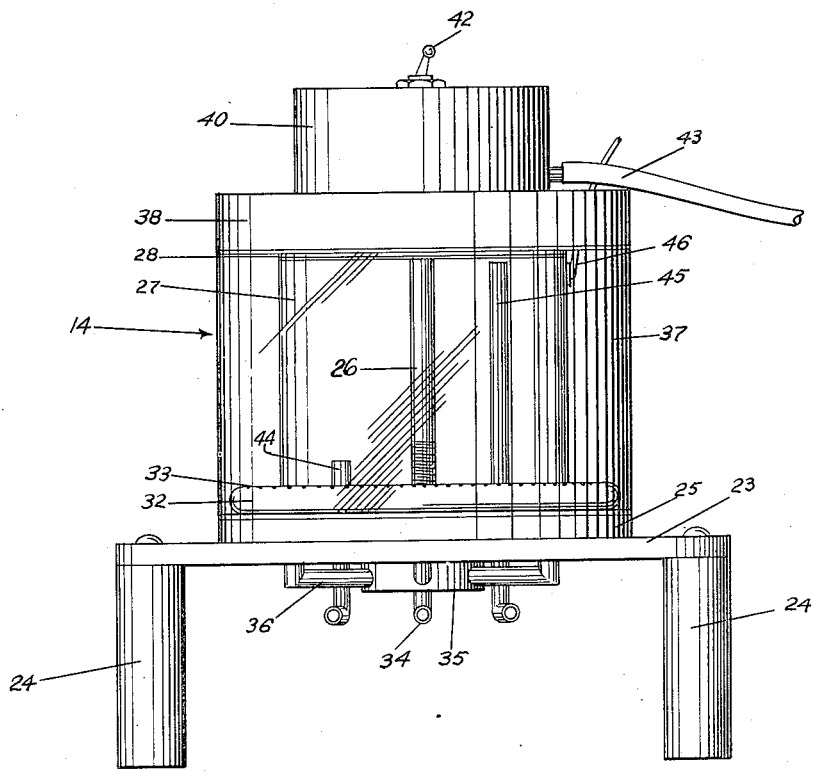
Fig. 2 is an elevation of the testing chamber of this invention.

The testing chamber 14 (Figs. 2 and 3) comprises base 23 supported by multiple legs 24. A circular base plate 25, of phenolic or similar material, rests upon base 23. A central clamping rod 26 extends upward from the center of base plate 25. Transparent cylinder 27 is clamped to base plate 25 by transparent cover plate 28, washer 29 and nut 30, which engages clamping rod 26. Gaskets 31, of rubber or similar material, are provided above and below transparent cylinder 27, to make the space enclosed thereby watertight.

Hollow ring 32 encircles the base of transparent cylinder 27 and is provided with a large number of air openings 33 in its upper surface. Hollow ring 32 is supplied with air through tube 34 and manifold 35 (Fig. 4), from which air is conducted by multiple radial tubes 36, which extend at their extremities through base 23 and base plate 25 to the hollow ring 32.

Concentrically enclosing transparent cylinder 27 and hollow ring 32 and resting upon base plate 25 is an outer transparent cylinder 37. Exhaust collar 38 rests upon transparent cylinder 37, and is provided with multiple exhaust openings 39. Housing 40 rests upon exhaust collar 39 and covers the central opening therein. Housing 40 is provided with multiple electric light bulbs 41 and a conveniently located light switch 42. Electric cable 43 conducts current to switch 42 and bulbs 41, which provide illumination for the interior of transparent cylinder 27.

Coolant entry tube 44 and coolant exit tube 45 extend through base 23 and base plate 25 to the interior of transparent cylinder 27. A thermocouple 46 can be secured to the outer surface of the transparent cylinder 27 in any suitable manner, and its leads extend through an enlarged exhaust opening 39 to suitable indicating or recording means (not shown).

In the operation of the apparatus of this invention the material to be tested is placed upon the outer surface of transparent cylinder 27 of the testing chamber 14. A plastic sheet can be secured to said outer surface by adhesive tape, elastic bands or in any other convenient manner, and in the case of liquids and pastes the outer surface of transparent cylinder 27 can be directly coated therewith.

Cold water is then circulated through the interior of transparent cylinder 27 by means of pump 20. Pump 20 pumps the coolant water from reservoir 19 through line 21 and coolant entry tube 44 into the interior of transparent cylinder 27. The water is forced out transparent cylinder 27 through coolant exit tube 45 and line 22 back into reservoir 19. The temperature of the water in reservoir 19 can be automatically controlled and held constant by any conventional means. If a coolant temperature of less than 32° F. is desired, a suitable coolant other than water can be utilized. The temperature of the outer surface of transparent cylinder 27 is indicated by suitable indicating means operated by thermocouple 46.

Pressurized air is introduced into water tower 10 through line 11 whereupon it bubbles through the water contained therein and becomes saturated with water vapor. The humidified air is then forced through line 12 and valve 13 to tube 34 and manifold 35. From manifold 34 the humidified air passes through radial tubes 36 to hollow ring 32, and issues therefrom through air openings 33 into the space contained between transparent cylinder 27 and transparent cylinder 37. The humidified air flows upward, over the material being tested which is on the outer surface of transparent cylinder 27, and exits through exhaust openings 39 in exhaust collar 38.

Under these conditions moisture condenses on the outer surface of transparent cylinder 27 and on the material being tested. The characteristics of the condensation on the material being tested are observed through transparent cylinder 37. Light bulbs 41 can be switched on by means of light switch 42, and the resultant light passes through transparent cover plate 28 and provides illumination in the interior of transparent cylinder 27, which illumination facilitates observance of the characteristics of the condensation on the surface of the material being tested.

Subsequently, valve 13 is closed and valve 18 opened, and air forced through drying tower 16 into the space between transparent cylinder 27 and transparent cylinder 37. The effect of evaporation of the moisture condensed on the surface of the material being tested is noted.

Thus the material being tested can be subjected to a cycle of moisture condensation and evaporation, which cycle is repeated any desired number of times in order that the effectiveness of the material being tested through repeated cycles of fogging and defogging can be observed.

It will be apparent that any ordinary jar or bottle can be utilized as water tower 10. Drying tower 16 can be any conventional laboratory drying tower filled with anhydrous calcium chloride or equivalent drying material. Rubber hose may serve as lines 11, 12, 15, 17, 21 and 22, and hose clamps may serve as valves 13 and 18.

Modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. An apparatus for testing the fogging characteristics of a transparent material, said apparatus comprising a first transparent cylindrical element adapted to have transparent material to be tested mounted adjacent the outer surface thereof, a transparent member closing one end of the first transparent cylindrical element, a second transparent cylindrical element forming a shell around said first element in spaced relation therefrom and defining a chamber therebetween, a first tube opening into the first element near one end thereof, a second tube opening into the first element near the other end thereof, a third tube opening into the chamber near one end thereof, and a light source disposed externally of the first element adjacent said transparent member for directing light through said transparent member into the first element and outward through the first and second elements.

2. An apparatus for testing the fogging characteristics of a material, said apparatus comprising a first cylindrical element adapted to have material to be tested mounted adjacent the outer surface thereof, a second cylindrical element of transparent construction forming a shell around first element in spaced relation therefrom and defining a chamber therebetween, a first tube opening into the first element near one end thereof, a second tube opening into the first element near the other end thereof, a third tube opening into the chamber near one end thereof, and a light source disposed to illuminate the chamber.

ARTHUR J. BERGER.

REFERENCES CITED

The following references are of record in the file of this patent:

UNITED STATES PATENTS

| Number | Name | Date |
| --- | --- | --- |
| 867,907 | Bond et al. | Oct. 8, 1907 |
| 1,818,619 | Harrison | Aug. 11, 1931 |
| 1,969,606 | Hall | Aug. 7, 1934 |
| 2,045,379 | Bennett | June 23, 1936 |
| 2,108,173 | Martin et al. | Feb. 15, 1938 |
| 2,316,624 | Romanelli | Apr. 13, 1943 |